June 2, 1936. F. G. SHOEMAKER 2,043,013
PISTON
Filed June 16, 1934
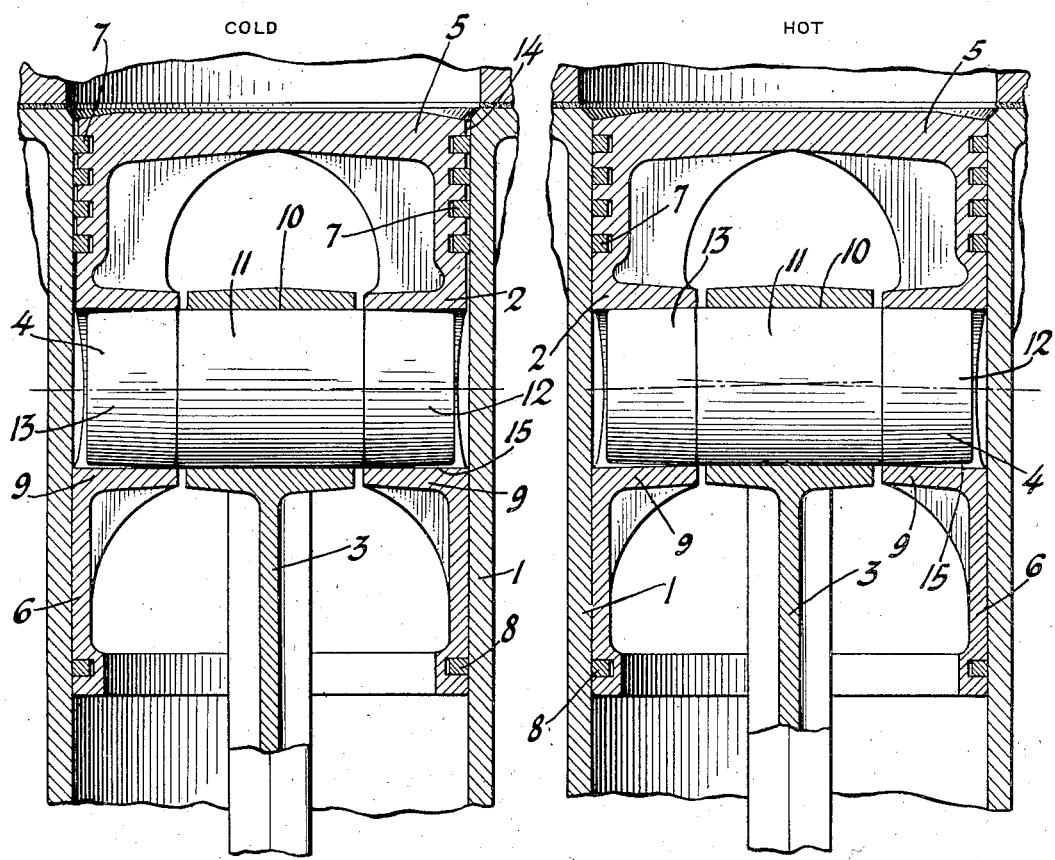
Fig. 1  Fig. 2
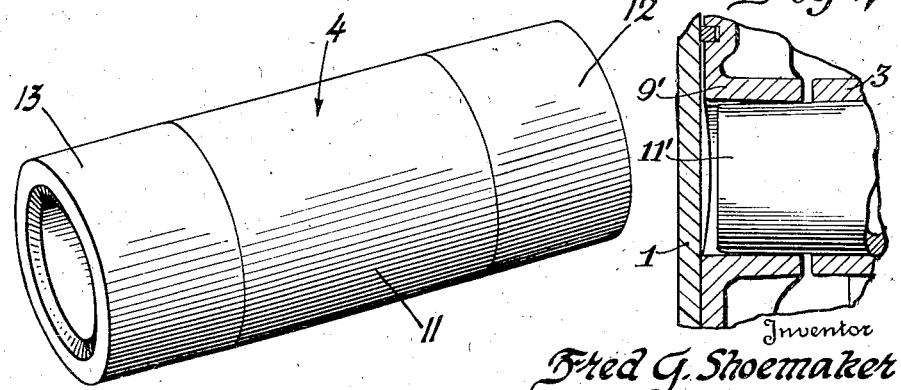
Fig. 3
Fig. 4
Inventor
Fred G. Shoemaker
By Blackmore, Spencer & Flint
Attorneys Patented June 2, 1936

2,043,013

UNITED STATES PATENT OFFICE 2,043,013

PISTON

Fred G. Shoemaker, Ferndale, Mich., assignor to General Motors Corporation, Detroit, Mich., a corporation of Delaware Application June 16, 1934, Serial No. 730,955

6 Claims. (Cl. 309—19)

This invention relates to the supporting of the ends of a wrist pin within the bosses on the piston head and more specifically to keeping a snug joint at certain specific points for different conditions of motor operation.

In the operation of an internal combustion engine it is well known that as the head of the piston heats up it expands. It is also true that since the explosive mixture burns just above the head of the piston, that portion will receive more heat than the skirt of the piston and therefore the expansion of the two parts will not be equal. Since the bosses, in which the ends of the wrist pins are secured, are between the head and the skirt, this uneven expansion of parts will misalign them and the axes of the bores of these bosses, if straight when the piston is cold, will be bowed upward at the center when the piston is hot. If a straight wrist pin is used, strain would be put both on the pin and the bosses and excess wear would result.

It is the object of this invention to provide such a fit between the piston bosses and the wrist pins that the joint will be snug at all times, without strain being applied to any part.

With this and other objects in view, my invention resides in the construction as described in the specification, claimed in the claims, and illustrated in the accompanying drawing, in which:

Figure 1 is a vertical sectional view through a cylinder and piston of my invention showing the position of the parts when the motor is cold.

Figure 2 is a similar view showing the position of parts when the motor is hot.

Figure 3 is an enlarged perspective view of the wrist pin.

Figure 4 is a section through one boss of a piston of a modified form of my invention.

A cylinder 1 of an internal combustion motor has a piston 2 reciprocating therein on normal operation. The reciprocating motion of the piston is supplied to a connecting rod 3 by a wrist pin 4 which secures the rod and piston together but allows rotary movement about the axis of the pin. The piston is composed of two parts, the head 5 and the skirt 6. The head has a plurality of piston rings 7 that surround the outer surface and are countersunk therein to seal the joint between the piston and the cylinder. The skirt portion also has a piston ring 8 in its exterior surface to prevent any leakage past that point.

On opposite sides of the piston below the head are formed two bosses 9 in which the ends of the wrist pin are supported. The center of the wrist pin fits in an opening 10 in the end of the connecting rod 3. The bore of the bosses and the opening in the connecting rod are all cylindrical. The diameter of the wrist pin is constant throughout its central portion 11 which engages the connecting rod, but the two end portions 12 and 13 of the wrist pin, which engage the bosses, are tapered toward the end.

As is best shown in Figure 1 under normal temperature, the diameter of the head 5 of the piston is smaller than the bore of the cylinder and there is a small space 14 between the two while the skirt is a tight fit in the cylinder, allowing for sliding. There is also a space 15 between the ends of the tapered wrist pins and the bore of the bosses. Now as the motor warms up, the head of the piston expands and becomes a tight fit, but since the skirt does not change its position, this expansion will throw the axes of the two bosses out of line, as best shown in Figure 2. But since the wrist pin ends were tapered, this distortion will now bring the top of the boss in line with the tapered top of the wrist pin to give a satisfactory joint without distorting the wrist pin. This will also, of course, give a space between the bottom of the pin and the boss of twice the size as before, but since practically all of the load on a piston is downward, this will be of no practical importance.

The drawing in the present case is of course exaggerated to clearly show the differences in diameter between the head and the skirt of the piston and the tapered clearance of the wrist pin with the boss. The actual difference in diameter between the head and skirt on an 8 inch piston is .05 to .06 inch which would not be noticeable to the eye.

In the practice of this invention the bore in the boss might be tapered and the wrist pin of constant diameter as shown in Figure 4 in which the wrist pin 11' is of constant diameter throughout and the boss 9' is tapered slightly outward to give the same clearance between the end of the pin and the boss as in the previous form and of course this form will operate in the same manner as the previous one.

It will therefore be seen that I have provided a device which compensates for the misalignment of the axes of the bosses due to unequal expansion of parts.

I claim:

1. In a piston assembly, a piston, spaced aligned constant diameter bosses therein, a wrist pin engaging the bosses, the ends of the wrist pin being tapered, whereby misalignment of the axes of the two bosses, due to expansion of parts of the piston, may be compensated for to still give a snug joint.

2. In a piston assembly, a piston having a head and a skirt, spaced aligned constant diameter bosses between the two, a wrist pin having tapered ends which engage the bosses, whereby uneven expansion of the head and skirt which misaligns the axes of the two bosses may be compensated.

3. In a piston assembly, a piston, a wrist pin having tapered end portions, two spaced aligned bosses on the piston of constant bore for the reception and direct engagement of the wrist pin ends, whereby a certain amount of misalignment of the bosses may be compensated for by the taper without distorting the pin.

4. In a piston assembly, a piston having a head and skirt, the head being of smaller diameter than the skirt, spaced normally aligned constant diameter bosses in the piston between the head and skirt, a wrist pin having tapered ends engaging the bosses, whereby uneven expansion between the head and skirt which misaligns the axes of the bosses may be compensated for by the taper without distorting the pin.

5. In a piston assembly, a piston, spaced aligned bosses therein, a wrist pin the ends of which fit within the bosses, the inner portion of the boss and the pin being a snug fit while the outer portion of the boss is spaced from the pin, the space increasing progressively toward the end of the pin, whereby misalignment of the bosses due to expansion of parts of the piston may be compensated for to give a snug joint.

6. In a piston assembly, a piston, spaced aligned constant diameter bosses therein, a wrist pin the end portions of which fit within the bosses, said end portions being tapered the inner portion of the boss and the wrist pin circumference contacting when cold and the boss and the outer end of the wrist pin being spaced apart and when heated the upper portion of the wrist pin ends contacting the boss throughout due to uneven expansion.

FRED G. SHOEMAKER.